(12) United States Patent
Cadeddu

(10) Patent No.: US 9,421,954 B2
(45) Date of Patent: Aug. 23, 2016

(54) HYDRAULIC BRAKING SYSTEM FOR FARM TRACTORS OR THE LIKE AND METHOD OF MANAGING SUCH SYSTEM

(71) Applicant: VHIT S.P.A., Offanengo (IT)

(72) Inventor: Leonardo Cadeddu, Offanengo (IT)

(73) Assignee: VHIT S.P.A., Offanengo (CR) (IT)

( * ) Notice: Subject to any disclaimer, the term of this patent is extended or adjusted under 35 U.S.C. 154(b) by 0 days.

(21) Appl. No.: 14/651,290

(22) PCT Filed: Nov. 27, 2013

(86) PCT No.: PCT/IB2013/060444
§ 371 (c)(1),
(2) Date: Jun. 11, 2015

(87) PCT Pub. No.: WO2014/091349
PCT Pub. Date: Jun. 19, 2014

(65) Prior Publication Data
US 2015/0314761 A1 Nov. 5, 2015

(30) Foreign Application Priority Data

Dec. 12, 2012 (IT) ................ TO2012A1065

(51) Int. Cl.
| | | |
|---|---|---|
| *F16D 49/12* | (2006.01) | |
| *B60T 8/40* | (2006.01) | |
| *B60T 8/32* | (2006.01) | |
| *B60T 8/46* | (2006.01) | |
| *B60T 15/36* | (2006.01) | |
| *B60T 17/22* | (2006.01) | |
| *B60T 13/14* | (2006.01) | |
| *B60T 8/34* | (2006.01) | |

(52) U.S. Cl.
CPC .............. *B60T 8/4013* (2013.01); *B60T 8/328* (2013.01); *B60T 8/46* (2013.01); *B60T 13/143* (2013.01); *B60T 15/36* (2013.01); *B60T 17/221* (2013.01); *B60T 17/222* (2013.01); *B60T 8/348* (2013.01)

(58) Field of Classification Search
CPC ......... B60T 8/328; B60T 8/40; B60T 8/4013
See application file for complete search history.

(56) References Cited

U.S. PATENT DOCUMENTS

| | | |
|---|---|---|
| 3,200,714 A | 8/1965 | Virtue et al. |
| 3,927,915 A | 12/1975 | Adachi |

(Continued)

FOREIGN PATENT DOCUMENTS

| | | | | |
|---|---|---|---|---|
| CL | WO 2015113174 A1 | * | 8/2015 | ............ B60T 13/162 |
| DE | 3305856 A1 | | 8/1984 | |

(Continued)

OTHER PUBLICATIONS

Machine translation of DE 3410506 (no date).*

*Primary Examiner* — Nicholas J Lane
(74) *Attorney, Agent, or Firm* — Howson & Howson LLP

(57) ABSTRACT

A hydraulic braking system for a farm tractor or the like comprises a first portion, including members (10, 19) for actuating/modulating the braking and operating with a first hydraulic fluid, and a second portion comprising braking members (F) and operating with a second hydraulic fluid incompatible with the first one. An interface device (20) is interposed between the two portions and is arranged to separate the two portions of the system (1) and to prevent fluid passages therebetween. A method of managing such a braking system (1) is also provided.

8 Claims, 1 Drawing Sheet

(56) References Cited

U.S. PATENT DOCUMENTS

| | | | | |
|---|---|---|---|---|
| 4,116,296 | A | * | 9/1978 | Pleier .................. B60T 11/103 180/273 |
| 4,203,631 | A | * | 5/1980 | Rivetti ................. B60T 13/161 303/52 |
| 4,382,364 | A | * | 5/1983 | Thomas ............... B60T 13/148 417/390 |
| 4,574,908 | A | * | 3/1986 | Brick ...................... B60T 7/22 180/169 |
| 4,783,128 | A | | 11/1988 | Resch |
| 5,558,413 | A | * | 9/1996 | Resch .................. B60T 8/3285 303/113.2 |
| 8,177,306 | B2 | | 5/2012 | Cadeddu et al. |
| 8,292,051 | B2 | | 10/2012 | Cadeddu et al. |
| 8,522,935 | B2 | | 9/2013 | Cadeddu |
| 2010/0289324 | A1 | | 11/2010 | Cadaddu |
| 2012/0111678 | A1 | | 5/2012 | Alberti et al. |
| 2013/0175852 | A1 | | 7/2013 | Cadeddu |

FOREIGN PATENT DOCUMENTS

| | | | | |
|---|---|---|---|---|
| DE | 3410506 | A1 | * 9/1985 | ............. B60T 13/12 |
| DE | 3929492 | A1 | 4/1990 | |
| DE | 102009054716 | A1 | 6/2011 | |
| DE | 102010056304 | A1 | 6/2012 | |

* cited by examiner

HYDRAULIC BRAKING SYSTEM FOR FARM TRACTORS OR THE LIKE AND METHOD OF MANAGING SUCH SYSTEM

TECHNICAL FIELD

This invention generally relates to braking systems for motor vehicles, in particular for operating machines such as farm tractors and the like, and more particular it concerns a hydraulic braking system for one such vehicle, equipped with safety functions and ancillary functions based on interventions on the vehicle's braking members.

PRIOR ART

In the last years, also vehicles such as farm tractors and the like, especially those capable of attaining relatively high speeds, have started being equipped with safety functions based on interventions on the vehicle's braking members. Among those functions, the one most familiar also to laymen is the Anti-lock Braking System, commonly known with the acronym ABS. Other safety functions are the Acceleration Slip Regulation (ASR), the stability control or Electronic Stability Program (ESP), and so on. The units actuating such safety functions can be entrusted also with actuating ancillary functions also requiring interventions on the braking members, such as the steering braking. For the sake of simplicity, hereinafter the term "ABS" will be used to denote the whole of such functions, unless specifically indicated otherwise.

Since, in general, some motor vehicles and, in particular farm tractors, to which reference will be made hereinafter for the sake of convenience of the description, usually have a hydraulic braking system, clearly it is desirable to use also hydraulic ABS systems. Examples of hydraulic ABS systems for farm tractors and the like are disclosed in DE 10 2010 056 304 and WO 2009/090078. Such known ABS systems operate with brake fluid, which is a non-mineral liquid, in particular a glycol-based or silicone-based liquid (fluid DOT 3, 4, 5).

DE 10 2010 056 304 also discloses using the ABS to carry out the steering braking in tractors having a single brake pedal.

In a similar context, FR 2637552 discloses a mechanical braking device for the rear wheels, supplemented with a hydraulic braking device for the front wheels, the latter being operated by a control liquid. A braking valve transmits the control pressure from the rear brakes to the front brakes by means of a different control liquid.

In many tractors, the braking system makes use of mineral oil in order to operate the braking members. In these cases, conventional hydraulic ABS systems designed for operating with non-mineral brake liquid, such as the systems disclosed in the documents mentioned above, cannot be used, since, as known to the skilled in the art, mineral oil would damage the components of the hydraulic control unit of the ABS. Use of a conventional hydraulic ABS would therefore compel to modify the braking system of the tractor in order to allow using brake liquid also for operating the braking members.

DESCRIPTION OF THE INVENTION

It is an object of the present invention to provide a hydraulic braking system equipped with ABS, which solves the problems mentioned above thereby enabling use of a conventional hydraulic ABS employing brake liquid while keeping the braking members of the tractor unchanged.

According to the invention, this is achieved in that, between a first portion of the braking system, comprising the devices managing said interventions and operating with a first hydraulic fluid (in particular, non-mineral brake fluid) and a second portion, comprising the braking members and operating with a second hydraulic fluid (in particular, mineral oil) an interface device arranged to separate both portions of the system and to prevent fluid passages therebetween is provided.

The interface device comprises a plurality of sections each associated with a braking member or a group of braking members that can be intervened upon independently of the other ones and, according to an advantageous feature of the invention, each section comprises a hydrostatic pump having:
  a first inlet communicating with the hydraulic control unit actuating the interventions so as to receive the first fluid;
  a second inlet communicating with a reservoir of the second fluid;
  an outlet communicating with the braking member or the group of braking members associated with the section.

Thanks to such a structure, the hydrostatic pump is arranged, in case of braking, to compress and send the second fluid under pressure to the outlet upon command of the pressure of the first fluid.

The invention also concerns a method of managing a braking system comprising two portions operating with a first and a second hydraulic fluid that are mutually incompatible, the method comprising the step of hydraulically separating the two portions of the system in order to prevent fluid passages from one portion to the other.

BRIEF DESCRIPTION OF THE FIGURES

The above and other features and advantages of the present invention will become apparent from the following description of preferred embodiments made by way of non limiting example with reference to the accompanying drawings, in which.

DESCRIPTION OF A PREFERRED EMBODIMENT

Figure 1:
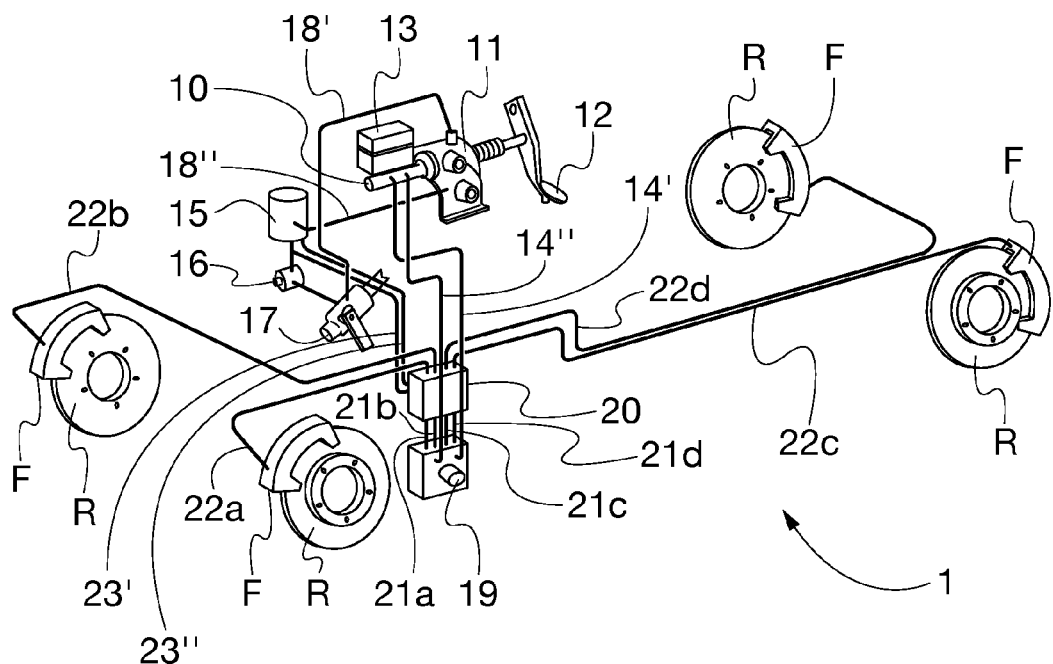
FIG. 1 is a schematic diagram of a braking system including the invention.

Referring to FIG. 1, there is shown a schematic diagram of the hydraulic part of braking system 1 of a farm tractor or the like, equipped with ABS, where use is made of two different and mutually incompatible fluids, in particular, mineral oil in the braking members and glycol-based or silicone-based brake fluid in the ABS and the master cylinder. In the illustrated example, the tractor has a double braking circuit and is of a kind where a single brake pedal acts on all four wheels through a tandem master cylinder. Functions such as steering braking, which in other kinds of tractors require the provision of two pedals and two separate master cylinders, are entrusted to a control software that also manages the safety functions. The functions of such software are not part of the present invention.

The diagram in FIG. 1 is given only by way of non limiting example, in order to make understanding of the principles of the invention easier, and the invention is employable in tractors or other vehicles with different braking systems, including however an ABS and using a first and a second mutually incompatible fluid. For the sake of simplicity, the electronics of the vehicle (electronic control unit and associated software, sensors of the different operating parameters, etc.), required for implementing the various functions associated with braking system 1, is not shown in the drawings, since it is not part of the present invention.

Braking system 1 includes an assembly of a master cylinder 10 and a hydraulic braking assistance system (servo brake or hydraulic brake booster) 11 with a back-up pump, which assembly is operated by brake pedal 12 through a suitable control rod. The assembly is for instance of a kind in which master cylinder 10 uses brake liquid, whereas brake booster 11 uses mineral oil. Assemblies of this kind are commonly used in vehicles of the type considered here. An example, also including an additional generator of hydraulic pressure and an accumulator, is manufactured by company Robert Bosch GmbH and is commercialised under the name Hydro-Max®.

Master cylinder 10 receives the brake liquid from a reservoir 13, advantageously a reservoir with two separate chambers in order to be able to separately feed both circuits 14', 14". On the contrary, brake booster 11 receives mineral oil from a reservoir 15, which in the illustrated example is the reservoir of hydraulic drive 17, it too suitably made of two portions given the presence of a double circuit. Reference numerals 18', 18" denote the ducts for feeding brake booster 11 with mineral oil and for the oil return to reservoir 15.

Outlet ducts 14', 14" of master cylinder 10 are connected to hydraulic control unit 19 of the ABS. In the example illustrated here, it is assumed that the ABS is a four-channel system, arranged to monitor and drive all four wheels R of the tractor. Control unit 19 in this case is arranged to distribute, through valves controlled by the electronic control unit, the fluid arriving from each duct 14', 14" between a respective pair of outlets 21a, 21b, or 21c, 21d for operating and controlling brakes F of the different wheels R. For instance, both outlets of hydraulic control unit 19 associated with a same inlet are associated with a same axle of the tractor. Control unit 19 can be made for instance as described in DE 10 2010 056 304.

According to the present invention, an interface device 20 interfacing the braking actuation/modulation part and brakes F is connected between hydraulic control unit 19 and the brakes themselves. Since the brakes demand mineral oil for their operation, whereas hydraulic control unit 19 operates with brake liquid, incompatible with mineral oil, device 20 has the main task of separating the portions of system 1 using the two liquids.

Device 20 includes as many sections (or channels) as are the ABS channels. Therefore, it includes, in the example considered here, four inlets connected to ducts 21a, 21b, 21c, 21d and four outlets 22a, 22b, 22c, 22d, each intended to convey the mineral oil necessary for the actuation to the brake of the corresponding wheel. The four sections of device 20 are fed with mineral oil through two further inlet ducts 23', 23" connected to a respective chamber of reservoir 15.

Essentially, in case of braking, device 20 receives brake liquid under pressure from one or more channels of control unit 19 of the ABS and delivers mineral oil under pressure to the brakes of the corresponding wheels. Taking into account such behaviour, device 20 will be referred to hereinafter as "bifluidic relay".

The four sections of device 20 can be individually built and coupled in modular manner, or they can be integrated into a single block. The structure of the different sections is the same, whereas their sizes could theoretically be different if the wheel brakes are different from one another. In practice however, for reasons of standardisation and manufacturing economy, it is preferred to have four identical sections, sized for the greatest one of the brakes.

The structure of one of the sections of bifluidic relay 20 will be disclosed hereinafter, with reference to FIG. 2.

Before illustrating such a structure in detail, the operation of the braking system disclosed will be shortly described. By actuating pedal 12, a force is applied to the control rod of brake booster 11, which, due to the hydraulic slaving, amplifies such a force and applies it to master cylinder 10. In master cylinder 10, the force applied by brake booster 11 is converted into a hydraulic pressure (of the brake liquid) in circuits 14', 14". Such a pressure arrives at hydraulic control unit 19 of the ABS, which transforms the inlet pressures into two pairs of pressures, always of the brake liquid, at outlets 21a, 21b, 21c, 21d. If the ABS does not intervene, both pressure pairs arrive unchanged at bifluidic relay 20, which applies them to the mineral oil and transmits them to brakes F through its outlets 22a, 22b, 22c, 22d, respectively. If there is an intervention of the ABS on one or more channels, the respective pressure of the brake liquid outgoing from the ABS control unit is on the contrary modulated by control unit 19 before being transmitted to bifluidic relay 20 and hence to the concerned wheel as a modulated mineral oil pressure. Such a modulation is, as it is clearly apparent, the intervention on the braking members mentioned above.

Figure 2:
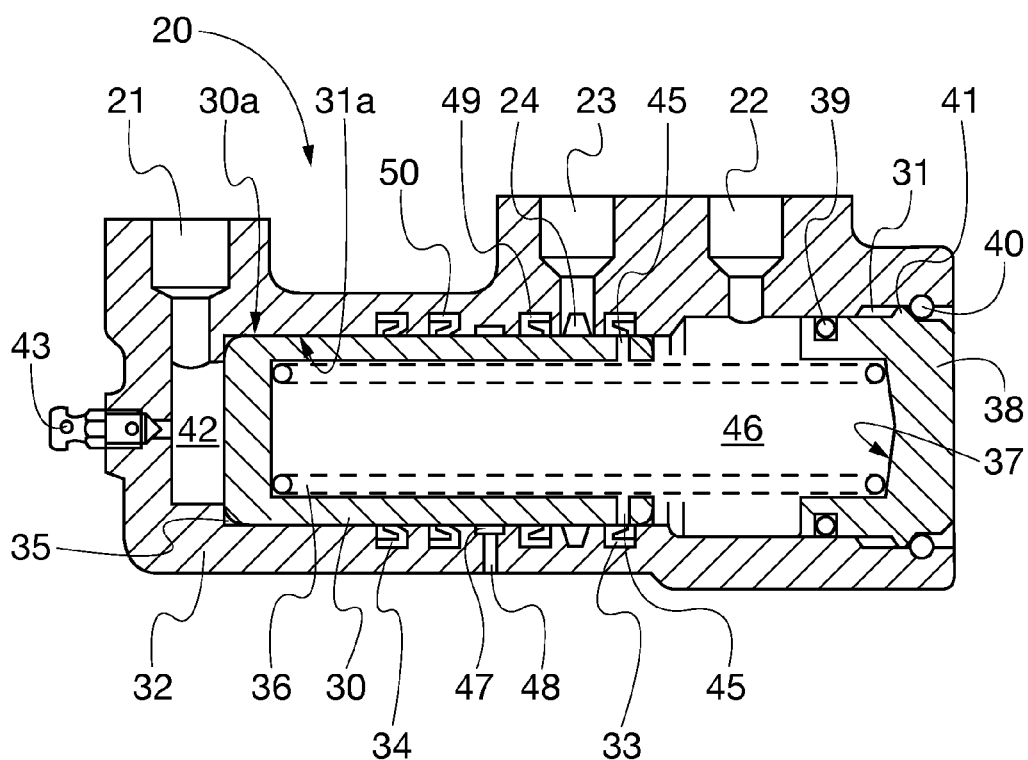
FIG. 2 is a longitudinal section of the device implementing one of the sections of the bifluidic relay used in the invention.

Referring now to FIG. 2, the section depicted therein is denoted by the same reference numeral 20 as the whole bifluidic relay. The inlets-outlets are denoted by the same reference numerals as in FIG. 1, without primes or suffixes.

Each section 20 comprises a hydrostatic pump. Such a pump is formed by hollow plunger 30, preferably with constant cross-sectional area—for instance with constant external diameter—slidably mounted in an axial cavity 31 of pump body 32. A pair of gaskets 33 and 34 (primary gaskets) ensures the hydraulic tightness between external surface 30a of plunger 30 and internal surface 31a (or bore) of cavity 31.

Under rest conditions, shown in FIG. 2, plunger 30 is kept in abutment against a shoulder 35 of body 32 by a resilient opposing member 36, for instance a spring, suitably preloaded and received in the cavity of plunger 30. Spring 36 rests at one end (which for the sake of clarity will be referred to as "fore end") against the internal fore wall of plunger 30 and at the rear end against the bottom of a seat 37 formed in a plug 38 closing the rear end of cavity 31 of body 32. A gasket 39 of plug 38 ensures the tightness between the inside of body 32 and the outside environment. A stop ring 40, cooperating with a protrusion 41 of plug 38, defines the axial position of the plug itself and hence of the plunger.

Inlet 21 for the brake fluid opens into a fore chamber 42, having a bleeding 43 and formed by the portion of cavity 31 defined between the fore end of plunger 30 and the fore bottom of the same cavity. Inlet 23 for the mineral oil opens instead into a ring chamber 24 communicating, through one or more passages 45 that can be closed by gasket 33 acting as a valve, with the internal cavity of plunger 30, which is open towards the rear end of cavity 31 of body 32. The internal cavity of plunger 30 and the rear portion of cavity 31 including seat 37 formed in plug 38 thus form a rear chamber 46, communicating with pump outlet 22.

An annular groove 47, communicating with the atmosphere through a drainage bore 48, is formed in internal surface 31a of cavity 31, around plunger 30, at a position between inlet 23 and the fore end of the same plunger.

Gaskets 49 and 50 (secondary gaskets) ensuring tightness in respect of the atmosphere are provided at both sides of such an annular groove 47, externally of plunger 30. Annular groove 47 and drainage bore 48 are to discharge brake liquid or mineral oil possibly leaked through gaskets 49 or 50 into the atmosphere, thereby preventing one fluid from damaging components intended to operate with the other fluid.

It is to be appreciated that the primary gaskets are to ensure tightness in respect of fluid under pressure. In case of wear, notwithstanding the provision of the secondary gaskets and of the drainage chamber, it might always happen that small amounts of brake liquid or mineral oil leak to the pump portion where the other fluid is present. In order to avoid this, secondary gaskets 49, 50 may be made of an elastomeric material and may be equipped with a scraper lip made of a material that is compatible with both fluids, such as for instance Teflon, arranged to convey the leaks, if any, into drainage groove 47.

The operation of bifluidic relay 20 can be immediately deduced form the above description. In case of braking, the brake fluid coming from hydraulic control unit 19 of the ABS, placed under pressure by the actuation of brake pedal 12 and having a pressure possibly modulated by the intervention of control unit 19, acts on the fore area of plunger 30 and, after having overcome the preload of spring 36, makes plunger 30 slide rearwards in chamber 31. Baskets 33, 34, 49, 50 ensure tightness during such a sliding. Sliding of plunger 30 makes gasket 33 close connection 45 between annular chamber 24 (an hence inlet 23) and rear chamber 46 and compresses mineral oil present in the latter. The mineral oil under pressure flows out through outlet 22 and actuates brake F of the corresponding wheel R, with or without braking modulation depending on whether the pressure at inlet 21 has been modulated or not by control unit 19. If, as preferred, plunger 30 has a constant cross-sectional area, the outlet pressure will be substantially the same as the inlet pressure, except for the small difference due to the frictions and to the load of opposing spring 36.

The invention actually attains the desired aim. Thanks to the bifluidic relay, which, because of its structure, ensures separation between the portions operating with mineral oil and the portions operating with brake liquid, it is possible to use a conventional hydraulic ABS fed with brake liquid, without need to modify the braking members requiring instead mineral oil.

It is clear that the above description has been given only by way of non-limiting example and that changes and modifications are possible without departing from the scope of the invention.

For instance, even if a system with master cylinder, brake booster and double circuit has been illustrated, the invention can be applied also to lower class vehicles, where the master cylinder—brake booster assembly is replaced by a conventional or differential tandem brake pump, always operating with brake liquid, or in tractors with a single-circuit pump.

Moreover, even if the application to the case of four channels for managing all wheels in the tractor has been disclosed, the invention can be employed also in an ABS having a different number of channels, e.g., three channels, if the rear wheels and the front axle are managed, or five channels, if also braking of the trailer is managed besides braking of the four wheels.

Further, it is self evident that the invention is compatible with any function based upon an intervention on the braking system, since it affects neither the parameters detected, nor the software processing such parameters and generating actuation commands for the valves modulating the fluid pressure in hydraulic control unit 19. So, besides the actual ABS, the ASR and the ESP mentioned above, a tractor equipped with the invention could also have for instance the functions known in the whole as Predictive Safety Systems or PSS (which include the Predictive Brake Assist or PBA, the Predictive Collision Warning or PCW, the Predictive Emergency Braking or PEB) and the Vehicle Dynamics Management or VDM, besides the steering braking or the trailer braking.

As to the trailer, the invention can also be used when the braking system thereof (not shown) is of pneumatic type. In this case, a valve supplying the compressed air controlling the trailer brakes could be hydraulically controlled by a section of interface 20 devoted to managing the trailer brakes. Yet, such a valve could also be directly controlled by control unit 19 with the first fluid.

The invention claimed is:

1. A hydraulic braking system for a vehicle having safety for an operating machine, wherein the braking system (1) comprises:
    a first portion (10, 19) operating with a first fluid and including a hydraulic control unit (19) for actuating interventions on braking members (F) of the operating machine, and
    a second portion (F) operating with a second fluid incompatible with the first one and including the braking members (F) of the operating machine,
    wherein an interface device (20) is interposed between the first portion (10, 19) and the second portion (F), which device is arranged to hydraulically separate said portions and to prevent fluid passages therebetween, and
    wherein the first fluid is a non-mineral brake liquid and the second fluid is a mineral oil.

2. The braking system as claimed in claim 1, wherein the interface device (20) comprises a plurality of sections each associated with one of the braking members or a group of the braking members of the operating machine that can be intervened upon independently from one another, and each section of the interface device (20) comprises a hydrostatic pump having:
    a first inlet (21) communicating with said hydraulic control unit (19) in order to receive the first fluid under pressure therefrom;
    a second inlet (23) communicating with a reservoir (15) of said second fluid; and
    an outlet (22) for supplying the braking members (F) associated with the section with said second fluid in order to actuate them;
    said hydrostatic pump being arranged, in case of braking, to compress the second fluid and to send it to the outlet (22) upon command of the first fluid under pressure and with a pressure depending on the pressure of the first fluid.

3. The braking system as claimed in claim 2, wherein:
    the hydrostatic pump includes a hollow plunger (30), which is mounted to slide in fluid-tight manner in an axial cavity (31) of a pump body (32) and which has one end defining, in the cavity (31) of the pump body (32), a first chamber (42) into which the first inlet (21) opens, and an internal cavity defining, with said cavity (31) of the pump body (32), a second chamber (46) in communication with the outlet (22);
    a third chamber (24), into which the second pump inlet (23) opens and which is in communication with the second chamber (46) in a rest condition of the pump, is formed between an outer surface (30a) of the plunger (30) and an internal surface (31a) of the cavity (31) of the pump body (32);

first and second primary gaskets (34, 33) are provided between the outer surface (30a) of the plunger (30) and the internal surface (31a) of the cavity (31) of the pump body (32), which gaskets provide tightness in respect of the first and the second fluid under pressure, respectively, the second gasket acting as a valve and being arranged to close a communication passage (45) between the third chamber (24) and the second chamber (46) when the plunger (30) is made to slide upon command of the first fluid in case of braking.

4. The braking system as claimed in claim 3, wherein said plunger (30) comprises an annular section having a constant cross-sectional area.

5. A method of managing a braking system (1) of of an operating machine, the method comprising the steps of:
   operating a first portion of the braking system (1) with a first hydraulic fluid; and
   operating a second portion of the braking system (1) with a second hydraulic fluid incompatible with the first one, and being characterised in that it further comprises the step of:
      hydraulically separating said first and second portions of the braking system (1) by interposing an interface device (20) between said portions of the braking system (1), in order to prevent fluid passages from one portion to the other,
   wherein the first portion of the braking system includes a hydraulic control unit (19) for actuating interventions on braking members (F) of the operating machine, and the second portion includes the braking members (F) of the operating machine, and
   wherein the first and the second fluid are a non-mineral brake liquid and a mineral oil, respectively.

6. The method as claimed in claim 5, wherein the step of separating the two portions of the braking system (1) comprises the steps of
   providing the interface device (20) with a plurality of sections each associated with one of the braking members or a group of the braking members (F) that can be intervened upon independently of the one another;
   supplying a first inlet (21) and a second inlet (23) of each section of said interface device (20) with the first fluid and the second fluid, respectively; and
   in case of braking, compressing the second fluid and sending it to an outlet (22) of the respective section upon command of the first fluid under pressure, in order to actuate said braking members (F).

7. The method as claimed in claim 6, wherein the step of compressing the second fluid and sending it to the outlet (22) comprises sending the second fluid to the outlet (22) with a pressure substantially identical to the pressure of the first fluid.

8. The braking system as claimed in claim 1, further comprising a safety function and an ancillary function based on said interventions on the braking members, wherein said safety function is at least one function selected from the group consisting of:
   Anti-lock Braking System function,
   Acceleration Slip Regulation function,
   Electronic Stability Program function,
   Predictive Brake Assist function,
   Predictive Collision Warning function,
   Predictive Emergency Braking function, and
   Vehicle Dynamics Management function;
and wherein said ancillary function is at least one of a steering braking function and a trailer braking function.

* * * * *